United States Patent [19]
Mazgarov et al.

[11] Patent Number: 5,849,656
[45] Date of Patent: Dec. 15, 1998

[54] CATALYST FOR DEMERCAPTANIZATION OF PETROLEUM DISTILLATES

[75] Inventors: A. M. Mazgarov; A. F. Vildanov; N. G. Bazhirova, all of Kazan, Russian Federation

[73] Assignee: Chevron U.S.A. Inc., San Francisco, Calif.

[21] Appl. No.: 816,713

[22] Filed: Mar. 13, 1997

Related U.S. Application Data

[62] Division of Ser. No. 313,635, Sep. 27, 1994, Pat. No. 5,741,415.

[51] Int. Cl.$^6$ ..................................................... C10G 21/18

[52] U.S. Cl. .......................... 502/185; 502/182; 502/183; 502/184

[58] Field of Search ............................. 502/527, 182–185

[56] References Cited

U.S. PATENT DOCUMENTS

| | | | |
|---|---|---|---|
| 2,042,052 | 5/1936 | Hoover | 196/29 |
| 2,315,820 | 4/1943 | Schulze | 196/29 |
| 2,914,467 | 11/1959 | Cross | 208/195 |
| 5,179,061 | 1/1993 | Haerle | 502/339 |
| 5,266,293 | 11/1993 | Fairey et al. | 502/326 |

*Primary Examiner*—Helane Myers
*Attorney, Agent, or Firm*—Richard J. Sheridan

[57] ABSTRACT

The demercaptanization of petroleum distillates may be carried out by means of the oxidation of the mercaptans contained therein using the oxygen in the air, at a temperature of about 80° to about 220° C., in the presence of about 0.01 to about 10.0 mass % of a water-soluble salt of copper, iron, nickel, or cobalt, on a fibrous carbonaceous material in the form of a woven fabric, felt, rope, or twisted strand, used as a heterogeneous catalyst. The fibrous carbonaceous material used in the process contains oxides of calcium, magnesium, copper, manganese, iron, zinc, and aluminum in an amount of up to about 0.03 mass %.

4 Claims, No Drawings

CATALYST FOR DEMERCAPTANIZATION OF PETROLEUM DISTILLATES

This is a divisional of application Ser. No. 08/313,635, filed Sep. 27, 1994 U.S. Pat. No. 5,741,415.

BACKGROUND OF THE INVENTION

The invention relates to the field of the removal of mercaptan sulfur from petroleum distillates by means of oxidation, and may be used in the oil refining industry for the demercaptanization of gasoline, kerosene, and diesel fractions.

Methods for the demercaptanization of petroleum distillates are known which involve the oxidation of mercaptans using the oxygen in the air in the presence of a base and heterogeneous catalysts containing phthalocyanines of cobalt or vanadium deposited onto hard substances, such as activated coal, graphite, alumina, mordenite, silica gel, and others (see USSR Patents Nos. 355805 and 654180; U.S. Pat. Nos. 4,033,860 and 4,481,106).

The principal disadvantages of the indicated methods consist in the insufficiently high degree of mercaptan oxidation in petroleum distillates and the significant alkali consumption required by the process.

From the point of view of its technical essence and the result obtained, the method which most closely resembles the method described herein is the method for the demercaptanization of high-boiling-point petroleum distillates by means of mercaptan oxidation using the oxygen of the air, in the presence of a 5% to 20% solution containing an alkali and a heterogeneous phthalocyanine catalyst, comprising cobalt phthalocyanine in an amount ranging from 0.005 to 0.9 mass %, deposited on a carbonaceous fibrous material in the form of a carbonaceous or graphite fiber.

The principal disadvantages of this method lie in the insufficiently high level of mercaptan oxidation in petroleum distillates, the low stability of catalytic activity of the catalyst, and the necessity of consuming significant quantities of the alkali substance.

SUMMARY OF THE INVENTION

The objective of the present invention consists in achieving an increase in the degree of demercaptanization of petroleum distillates, an increase in the stability of the catalytic activity of the catalyst, and the elimination of the necessity of using significant quantities of the base.

Thus, in accordance with the present invention there is provided a method for the demercaptanization of mercaptan-containing petroleum distillates by means of the oxidation of said mercaptans with the oxygen of the air in the presence of a heterogeneous catalyst, said method comprising contacting said mercaptans with oxygen in the presence of a catalyst comprising a water-soluble salt of copper, iron, nickel, or cobalt, in an amount ranging from about 0.01 to about 10.0 mass %, which is deposited onto a fibrous carbonaceous material, said material containing oxides of metals of variable valence; said method being carried out at a temperature falling within the range of about 80° to about 200° C.

Also provided in accordance with this invention is a catalyst comprising a fibrous carbonaceous material containing oxides of metals of variable valence, and having deposited on said material, in an amount from about 0.01 to about 10.0 mass %, a water-soluble salt of copper, iron, nickel or cobalt.

DETAILED DESCRIPTION OF PREFERRED EMBODIMENTS

According to the method of the invention, the stated objective is achieved by providing a method for the demercaptanization of petroleum distillates by means of the oxidation of mercaptans using the oxygen of the air, in the presence of a heterogeneous catalyst. For the latter, according to this method, a water-soluble salt of copper, iron, nickel, or cobalt may be used, in an amount ranging from 0.01 to 10.0 mass %, deposited on a fibrous carbon material in the form of a fabric-type material, felt, or rope, containing oxides of metals of variable valence, the process being carried out at a temperature ranging from about 80° to about 220° C.

For this purpose, a carbonaceous fibrous material is used, containing oxides of calcium, magnesium, copper, manganese, iron, zinc and aluminum, in quantities which provide sufficient basicity for the oxidation of the mercaptans to occur. Typically, this amount will be up to about 0.03 mass %.

The distinguishing features of the proposed method consist in the use of a heterogeneous catalyst, containing from about 0.01 to about 10.0 mass % of a water-soluble salt of copper, iron, nickel, or cobalt, on a material which consists of carbonaceous fibers; the use of a carbonaceous fibrous material in the form of a woven fabric (cloth), felt, or rope (twisted strand), containing the oxides of the above mentioned metals of variable valence in an amount of up to about 0.03 mass %; and the performance of the process at a temperature ranging from about 80° to about 220° C.

The cited distinguishing features of the proposed method define its novelty and significant departure from the methods known in the art at its present technical level, since the application of a water-soluble salt of copper, iron, nickel or cobalt as a catalyst, with a carbonaceous fibrous material in the form of a woven fabric, felt, or rope (twisted strand) containing oxides of metals of variable valence being used as the bearer of the catalyst, is not described in the literature and allows the process of demercaptanization of petroleum distillates to be performed with a higher degree of mercaptan oxidation under prolonged use of the catalyst and without the use of a base.

Examples of the water-soluble salts of copper, iron, nickel, and cobalt include, but are not limited to, salts of inorganic acids such as the sulfates, chlorides and nitroxides (nitrates) of these metals. Phenylates (i.e., Ph—O—Me—O—Ph where Me is the metal and Ph is phenyl) may also be used. For instance, copper sulfate, copper chloride, copper phenylate, iron sulfate, nickel nitroxide and cobalt nitroxide are useful in the practice of this invention, with copper phenylate being particularly preferred because it does not carry over into the demercaptanized product.

The proposed content of the water-soluble salt of Cu, Fe, Ni, or Co on the carbonaceous fibrous material in an amount ranging from 0.01 to 10.0 mass % is both necessary and sufficient, since with a content of the water-soluble salt of copper, iron, nickel, or cobalt which is less than 0.01 mass %, the required degree of mercaptan oxidation is not achieved. At the same time, the higher limit for the content of a water-soluble salt of copper, iron, nickel, or cobalt (10.0 mass %) is determined by the adsorptive properties of the carbonaceous fibrous material with respect to the water-soluble salt of copper, iron, nickel, or cobalt.

The use of a carbonaceous fibrous material containing oxides of metals having a variable valence in an amount of up to about 0.03 mass % makes it possible to create a necessary and sufficient basicity of the catalyst being used, and, as a result, to eliminate the need to rely on the application of an alkaline substance in the process.

Typical oxides of metals of variable valence which are useful in this invention include, but are not limited to, oxides of calcium, magnesium, iron, manganese, copper, zinc and aluminum. Generally, these oxides are considered to but water-insoluble or only slightly soluble in water.

Carbonaceous fibrous materials in the form of a woven fabric, felt, or rope (twisted strand), containing the oxides of metals of variable valence in an amount of up to about 0.03 mass % are industrially produced by a process involving the soaking of the material in solutions of salts of the aforesaid metals, with their subsequent thermal treatment.

By conducting the process at a temperature ranging from about 80° to about 220° C., it becomes possible to carry out the oxidation of mercaptans in petroleum distillates at the temperatures of their liberation, without preliminary cooling, and, as a result, to increase the degree of mercaptan oxidation and to reduce energy consumption, as well as associated energy costs, for the demercaptanization of petroleum distillates.

The preparation of the proposed catalyst is carried out in accordance with the known method of soaking a carbonaceous fibrous material containing oxides of calcium, magnesium, copper, manganese, iron, zinc, and aluminum in aqueous solutions of the salts of copper, iron, nickel, or cobalt, at the required concentration, with subsequent drying.

The proposed method has found approbation under laboratory conditions in examples involving the demercaptanization of a model mixture of dodecylmercaptan in dodecane, a gasoline fraction (boiling-off range 60° to 180° C.), a kerosene fraction 120° to 240° C.), and a diesel fraction (180° to 350° C.).

The method is illustrated by the following examples.

EXAMPLE 1

Five grams of a heterogeneous catalyst containing 10 mass % copper sulfate on a carbonaceous fabric which further contains oxides of calcium, magnesium, copper, manganese, iron, zinc, and aluminum in a quantity of 0.03 mass % are loaded into a batch reactor. The copper sulfate is deposited onto the carbonaceous fabric by the method of soaking to saturation using an aqueous solution. Then, 35 ml of a model solution of n-dodecylmercaptan in dodecane are loaded into the reactor.

The reactor constitutes a cylindrical vessel made of glass, having a capacity of 100 ml, heated from the outside by a metallic spiral. Air is supplied to the reactor from the bottom; this air is evenly distributed within the reactor space due to the Schott filter which has been installed in the lower part of the reactor. The oxidation of the mercaptans is carried out with the oxygen of the air, at a temperature of 100° C. and atmospheric pressure, with air being supplied at a rate of 0.5 l/min. The time of oxidation is 4 minutes.

The mercaptan sulfur content in the starting and refined raw material is determined by method of potentiometric titration.

The results of the experiment are presented in Table 1.

EXAMPLES 2–13

The demercaptanization of a model mixture of dodecylmercaptan in dodecane is carried out by a method similar to the one described for Example 1. The composition of the catalyst and the results of the experiment are given in Table 1.

EXAMPLES 14–16

The demercaptanization of a model mixture of dodecylmercaptan in dodecane is carried out by a method similar to the one described for Example 1, in the presence of known catalysts. The results of the experiment are given in Table 1.

EXAMPLE 17

Under the same conditions as those described in Example 1, in the presence of a heterogeneous catalyst which contained 1 mass % copper sulfate on a carbonaceous fabric containing 0.03 mass % of the oxides of metals indicated in Example 1, at a temperature of 220° C., over a period of 5 minutes, the demercaptanization of a diesel fraction having a mercaptan sulfur content equal to 0.02 mass % is carried out. Analysis of the demercaptanized diesel fraction showed the residual content of mercaptan sulfur to be 0.0005 mass %. At the same time, the degree of oxidation of mercaptans in the diesel fraction constitutes 97.5%.

EXAMPLE 18

Under the same conditions as those described in Example 1, in the presence of a known heterogeneous catalyst which contains 0.5 mass % of cobalt disulophthalocyanine on a carbonaceous fabric (without oxides of metals) and a 20% alkali solution, at a temperature of 220° C., over a period of 5 minutes, the demercaptanization of a diesel fraction with a mercaptan sulfur content equal to 0.02 mass % is carried out. Analysis of the demercaptanized diesel fraction showed the residual content of mercaptan sulfur to be 0.0075 mass %. At the same time, the degree of oxidation of mercaptans in the diesel fraction constitutes 62.5%.

EXAMPLE 19

Under the same conditions as those described in Example 1, in the presence of a heterogeneous catalyst which contains 1 mass % of copper sulfate on a carbonaceous fabric containing 0.03 mass % of the oxides of metals described in the example, over a period lasting 3 minutes, the demercaptanization of a gasoline fraction having a mercaptan sulfur content of 0.077 mass % is carried out. Analysis of the demercaptanized fraction indicated the residual content of mercaptan sulfur to be 0.0001 mass %. At the same time, the degree of oxidation of the mercaptans in the gasoline fraction constitutes 99.87%.

EXAMPLE 20

Under the same conditions as those described in Example 1, in the presence of a known heterogeneous catalyst which contains 0.5 mass % of cobalt disulophthalocyanine on a carbonaceous fabric (without oxides of metals) and a 20% alkali solution, at a temperature of 80° C., over a period of time lasting 3 minutes, the demercaptanization of a gasoline fraction with a mercaptan sulfur content of 0.077 mass % is carried out.

Analysis of the demercaptanized fraction demonstrated the residual sulfur content to be 0.028 mass %.

At the same time, the degree of mercaptan oxidation in the gasoline fraction constitutes 63.6%.

TABLE 1

| Example No. | COMPOSITION OF THE CATALYST | Oxidation time in minutes | Mercaptans sulfur content in the raw material, mass % | | Degree of purification |
|---|---|---|---|---|---|
| | | | prior to purification | after purification | |
| 1 | 10 mass % copper sulfate on carbonaceous fabric containing 0.03 mass % metal oxides. | 4 | 0.015 | absent | 100 |
| 2 | 1 mass % copper sulfate on carbonaceous fabric containing 0.03 mass % metal oxides | 4 | 0.015 | 0.0001 | 99.8 |
| 3 | 0.1 mass % copper sulfate on carbonaceous fabric containing 0.03 mass % metal oxides | 4 | 0.015 | 0.0012 | 92.2 |
| 4 | 0.01 mass % copper sulfate on carbonaceous fabric containing 0.03 mass % metal oxides | 4 | 0.015 | 0.0032 | 78.2 |
| 5 | 1 mass % copper sulfate on carbonaceous fabric containing 0.01 mass % metal oxides | 4 | 0.015 | 0.001 | 93.3 |
| 6 | 1 mass % copper sulfate on carbonaceous fabric containing 0.02 mass % metal oxides | 4 | 0.015 | 0.0002 | 98.7 |
| 7 | 10 mass % copper sulfate on carbonaceous felt containing 0.03 mass % metal oxides | 4 | 0.015 | absent | 100 |
| 8 | 1 mass % copper sulfate on carbonaceous felt containing 0.03 mass % metal oxides | 4 | 0.015 | absent | 100 |
| 9 | 0.1 mass % copper sulfate on carbonaceous felt containing 0.03 mass % metal oxides | 4 | 0.015 | 0.0006 | 96.0 |
| 10 | 1 mass % iron sulfate on carbonaceous fabric containing 0.03 mass % metal oxides | 4 | 0.015 | 0.0021 | 86.0 |
| 11 | 1 mass % nickel nitroxide on carbonaceous fabric containing 0.03 mass % metal oxides | 4 | 0.015 | absent | 100 |
| 12 | 1 mass % cobalt nitroxide on carbonaceous fabric containing 0.03 mass % metal oxides | 4 | 0.015 | 0.0007 | 95.5 |
| 13 | 1 mass % copper chloride on carbonaceous fabric containing 0.03 mass % metal oxides | 4 | 0.015 | absent | 100 |
| 14* | 1 mass % cobalt disulfophthalocyanine carbonaceous fabric without metal oxides, and 5 ml of 2.5% aqueous solution of caustic soda | 4 | 0.015 | 0.0031 | 79.5 |
| 15* | 0.5 mass % cobalt tetrasulfophthalocyanine arbonaceous fabric without metal oxides, and S ml of 2.5% aqueous solution of caustic soda | 4 | 0.015 | 0.00285 | 81.0 |
| 16* | 0.5 mass % cobalt tetrasulfophthalocyanine on arbonaceous fabric without oxides, and 5 ml of a 20% aqueous solution of caustic soda | 4 | 0.015 | 0.0029 | 80.5 |

*Comparative example.

On the basis of the experimental data presented in Table 1 and in Examples 17 through 20, it can be seen that by carrying out the treatment process according to the proposed method, as compared to the known method, it becomes possible to increase significantly (by 15% to 35%) the degree of mercaptan oxidation in petroleum distillates, and to carry out the process without the use of an alkali substance.

The following example illustrates the preservation of high catalytic activity after prolonged use of the catalyst.

EXAMPLE 21

Under the same conditions as those described in Example 1, in the presence of 3 grams of a heterogeneous catalyst containing 1 mass % of copper sulfate on a carbonaceous fabric which contained 0.03 mass % of oxides of metals, a kerosene fraction (120+240) originating from the petroleum refinery of Ryazan, having a content of mercaptan sulfur of 0.0082% mass %, is subjected to demercaptanization over a period of 10 minutes. The purified kerosene is drained off, and a fresh portion of kerosene is poured into the reactor and subjected to oxidation. The process is repeated for several tens of cycles. In a similar manner, the demercaptanization of a kerosene fraction is carried out in the presence of a known catalyst. The results of the experiment are given in Table 2.

On the basis of the experimental data presented in Table 2, it can be seen that the proposed method, as compared to the known method, achieves a high stability of the catalytic activity of the catalyst being used under conditions of its repeated and frequent use, without regeneration.

The indicated advantages of the proposed method as compared to the known method, allow significant improvements to be made in the technical and economic indicators of the process in question.

TABLE 2

| Example No. | CATALYST NAME | Number in the cycle | Mercaptans sulfur content in the raw material, mass % prior to purification | Mercaptans sulfur content in the raw material, mass % after purification | Degree of purification |
|---|---|---|---|---|---|
| 21 | 1 mass % copper sulfate on a carbonaceous fabric containing 0.03 mass % metal oxides | 1<br>2<br>3<br>4<br>5 | 0.0082 | absent | 100 |
| 22* | 1 mass % copper disulfophthalocyanine on a carbonaceous fabric without metal oxides, together with 5 ml of a 20% aqueous solution of caustic soda | 1<br>2<br>3<br>4 . . . 50 | 0.0082 | 0.00205<br>0.0022<br>0.00243<br>0.00281 . . . 0.0036 | 75.0<br>72.9<br>70.4<br>65.7 . . . 55.9 |

*Comparative example

What is claimed is:

1. A catalyst comprising a carbonaceous material in the form of a woven fabric, felt or twisted strand containing oxides of metals selected from the group consisting of calcium, magnesium, iron, manganese, copper, zinc and aluminum, and having deposited on said material, in an amount from about 0.01 to about 10.0 mass %, a water-soluble salt of copper, iron, nickel or cobalt.

2. The catalyst of claim 1, wherein the carbon fiber material contains oxides of calcium, magnesium, iron, manganese, copper, zinc, and aluminum in an amount up to about 0.03 mass %.

3. The catalyst of claim 1 wherein the water-soluble salt is copper sulfate, copper chloride, copper phenylate, iron sulfate, nickel nitroxide, or cobalt nitroxide.

4. The catalyst of claim 3 wherein the water-soluble salt is copper phenylate.

* * * * *